Sept. 1, 1970           G. A. WARREN           3,526,493
GLASS MELTING FURNACE WITH INSULATING ROOF STRUCTURE
Filed Oct. 6, 1967
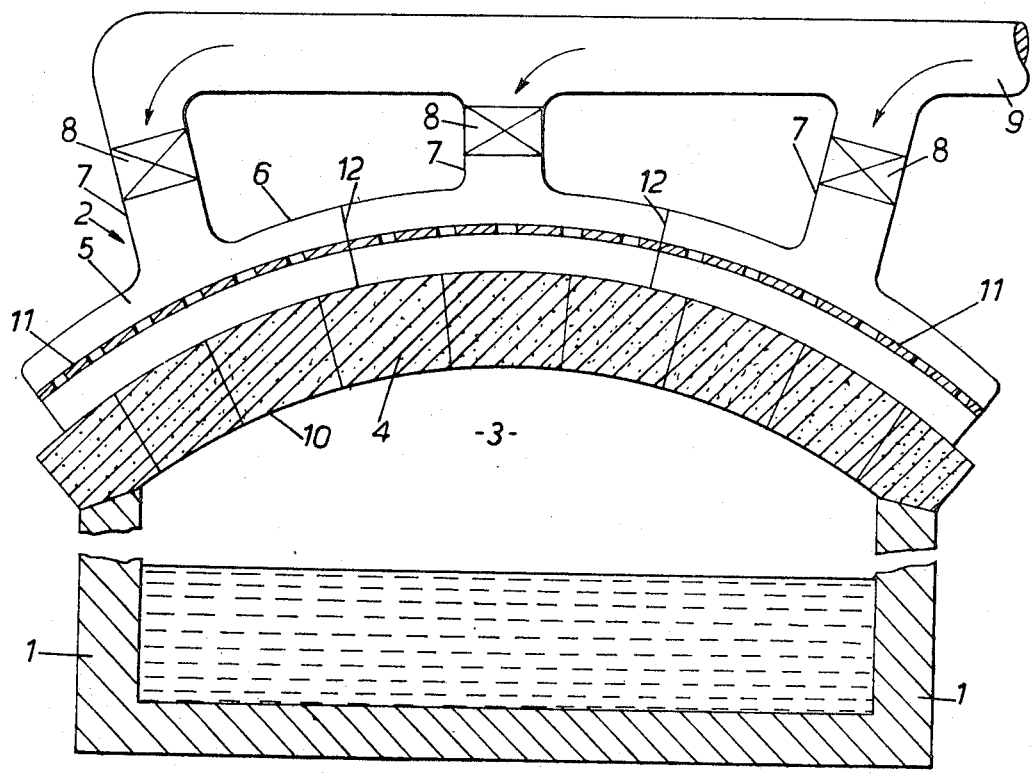
Inventor
Geoffrey Allan Warren
By Morrison, Kennedy & Campbell
Attorneys

United States Patent Office 3,526,493
Patented Sept. 1, 1970

3,526,493
GLASS MELTING FURNACE WITH INSULATING ROOF STRUCTURE
Geoffrey Allan Warren, St. Helens, England, assignor to Pilkington Brothers Limited, Liverpool, England, a corporation of Great Britain
Filed Oct. 6, 1967, Ser. No. 673,346
Claims priority, application Great Britain, Nov. 21, 1966, 52,089/66
Int. Cl. C03b 9/38
U.S. Cl. 65—356          2 Claims

ABSTRACT OF THE DISCLOSURE

A glass melting furnace includes a roof structure having a porous wall backed by a plenum chamber, a perforated insulated plate extending across the plenum chamber and facing the porous wall, and a conduit for supplying a gas to part of the plenum chamber separated from the porous wall by the plate. The gas flows through the perforated plate and then diffuses through the porous wall.

BACKGROUND OF THE INVENTION

The present invention relates to glass manufacturing apparatus and methods, and more especially to the protection of the crown of a glass melting furnace from excessive heat and corrosion.

In a glass melting furnace of the kind in which hot gases are directed across the surface of the melt, the softening point of the refractory material used for the furnace crown imposes an upper limit on the glass melting temperatures which may be safely attained in the furnace, whilst deterioration of the inner lining of the crown due to attack by corrosive vapours presents an important maintenance problem.

It is a main object of the present invention to provide improved glass manufacturing apparatus and methods in which furnace materials are preserved from these disadvantages.

SUMMARY

According to the present invention, a glass manufacturing apparatus includes means for supplying a hot gas flow into a headspace defined by a roof structure located over the glass which roof structure includes a porous wall backed by a plenum chamber, and means for supplying a gas to the plenum chamber which gas in operation diffuses through the porous wall into the headspace.

Further the invention provides a glass melting furnace having a porous crown through which, in operation, the gas diffuses from the plenum chamber.

The invention further comprehends in a method of melting glass forming materials in which hot gases are directed across the surface of the melt in a glass melting furnace, the steps of introducing cooling gas into the headspace over the melt through a porous crown for the furnace, thereby cooling the crown structure and providing beneath said crown a buffer layer of gas to protect the crown from hot gases in the headspace.

BRIEF DESCRIPTION OF THE DRAWINGS

The figure shows, by way of example, a vertical section through the roof structure of a glass melting furnace.

DESCRIPTION OF THE PREFERRED EMBODIMENT

Referring to the drawing a glass melting furnace 1 includes a roof structure 2, defining a headspace 3 over the melt in the furnace. The roof structure 2 has an inner lining 4 of porous refractory material constituting the crown of the furnace, which crown is backed by a plenum chamber 5 enclosed by walls, indicated diagrammatically at 6, attached to the crown 4. Gas ducts 7 are connected to the plenum chamber 5, and valves 8 connect the ducts 7 to a common supply duct 9.

In operation of the furnace, a cooling gas, for example air or nitrogen, is pumped into the chamber 5 from the duct 9 at a pressure only slightly in excess of the gas pressure in the headspace 3 of the furnace 1. The gas permeates through the porous lining 4, which may conveniently be of silica or sintered metal, and cools the crown structure as well as providing a constantly replenished buffer layer of cooling gas which clings to the inner face 10 of the crown 4 and constitutes a barrier to protect the crown from the full heat of the headspace 3, thereby maintaining the crown 4 below its softening temperature even when the headspace 3 is at a higher temperature. In addition, the gas barrier protects the face 10 from corrosive vapours emitted by the glass melt and thereby minimises corrosion of the porous crown 4. A perforated plate 11 may be provided in the plenum chamber 6 to assist in equalising the pressure in the sections of the plenum chamber 6 into which the chamber is divided by partitions 12. Each section of the plenum chamber is individually supplied by one of the ducts 7. The insulating plate 11 also serves to thermally isolate the refractory crown 4 from the remainder of the roof construction should overheating occur due to failure of the cooling gas supply.

A glass melting furnace according to the present invention as above described, may be fired up to about 1600° C., and heat transfer is improved because the furnace can be run at a higher flame temperature, on account of the protection afforded to the furnace crown. Moreover the present invention offers a convenient method of controlling the furnace atmosphere by the uniform introduction of the gas into the furnace headspace, and if air is used, for example, combustion can be increased in this way.

The upper wall portions of the furnace, located above the level of the melt may also be formed of a porous wall backed by a plenum chamber supplied with gas which diffuses through the porous material of the wall portions into the headspace of the apparatus thereby providing protective gas layers clinging to the furnace walls.

I claim:
1. Apparatus for containing molten glass, including a roof structure defining a headspace over the glass, which roof structure includes a porous wall backed by a plenum chamber, a perforated insulating plate extending across the plenum chamber and facing the porous wall, and means for supplying a gas to part of the plenum chamber separated from the porous wall by said plate, which gas in operation flows through the perforated plate and then diffuses through the porous wall into the headspace.

2. Apparatus according to claim 1, wherein the roof structure is the roof of a glass melting furnace, and said porous wall constitutes the crown of the furnace through which in operation gas diffuses to feed a buffer layer of gas protecting the crown from hot gases in the headspace of the furnace.

References Cited

UNITED STATES PATENTS 1,833,712  11/1931  Hawke ---------------- 65—26
2,478,090   8/1949  Devol.

S. LEON BASHORE, Primary Examiner

E. R. FREEDMAN, Assistant Examiner

U.S. Cl. X.R.

13—6; 65—25, 134, 337